US011226228B2

(12) United States Patent
Rambler et al.

(10) Patent No.: US 11,226,228 B2
(45) Date of Patent: Jan. 18, 2022

(54) REMOVABLE SCALE AND SCANNER SYSTEM CONTROL FROM A SYSTEM WITH A MAINTAINED STANDALONE CALIBRATION MEMORY

(71) Applicant: NCR Corporation, Atlanta, GA (US)

(72) Inventors: Mark Allen Rambler, Decatur, GA (US); Paul Oliver Detwiler, Lawrenceville, GA (US); Kenneth Joseph Fabian, Grayson, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/715,194

(22) Filed: Dec. 16, 2019

(65) Prior Publication Data
US 2020/0116551 A1    Apr. 16, 2020

Related U.S. Application Data

(62) Division of application No. 15/472,986, filed on Mar. 29, 2017, now Pat. No. 10,539,455.

(51) Int. Cl.
*G01G 23/01* (2006.01)
*H04N 1/113* (2006.01)
*G01G 19/414* (2006.01)
*G06K 7/10* (2006.01)

(52) U.S. Cl.
CPC ......... *G01G 23/01* (2013.01); *G01G 19/4144* (2013.01); *H04N 1/113* (2013.01); *G06K 7/10851* (2013.01); *H04N 2201/0084* (2013.01)

(58) Field of Classification Search
CPC .... G01G 23/01; G01G 19/4144; H04N 1/113; H04N 2201/0084; H04N 1/18; H04N 1/819; H04N 1/40068; G06K 7/10851
USPC .............................................................. 177/1
See application file for complete search history.

(56) References Cited

U.S. PATENT DOCUMENTS

| | | | | |
|---|---|---|---|---|
| 4,660,663 A | * | 4/1987 | Amacher | G01G 23/3707 177/165 |
| 5,008,518 A | * | 4/1991 | Taussig | A47F 9/046 177/4 |
| 5,086,879 A | * | 2/1992 | Latimer | A47F 9/046 186/61 |
| 9,155,406 B1 | * | 10/2015 | Whiteside | G07G 1/0018 |
| 2002/0052703 A1 | | 5/2002 | Tabet | |
| 2005/0185227 A1 | * | 8/2005 | Thompson | H04N 1/00063 358/474 |
| 2005/0185277 A1 | | 8/2005 | Boyd | |
| 2005/0263580 A1 | * | 12/2005 | Stulz | G07G 1/0027 235/22 |
| 2006/0208894 A1 | * | 9/2006 | Friend | G06K 7/10554 340/572.3 |
| 2009/0114730 A1 | * | 5/2009 | Tashiro | G07G 1/0054 235/7 A |

(Continued)

*Primary Examiner* — Alexander A Mercado
*Assistant Examiner* — Monica S Young
(74) *Attorney, Agent, or Firm* — Schwegman, Lundberg & Woessner

(57) ABSTRACT

A scale and scanner system includes a controller to control operation of the scale and scanner system. A scale calibration parameter memory for storing scale calibration parameters is coupleable to the controller. A scanning module and a scale module are coupleable to the controller. When the controller is not coupled to the scanning module or scale module, the scale calibration parameter memory remains in the system.

6 Claims, 10 Drawing Sheets

(56) References Cited

U.S. PATENT DOCUMENTS

| | | | |
|---|---|---|---|
| 2009/0306924 A1* | 12/2009 | Olmstead | G01G 19/4144 |
| | | | 702/101 |
| 2010/0141977 A1* | 6/2010 | Ueda | G03G 21/1628 |
| | | | 358/1.13 |
| 2011/0149354 A1 | 6/2011 | Takamura | |
| 2013/0056285 A1* | 3/2013 | Meagher | G01G 19/4144 |
| | | | 177/1 |
| 2014/0292172 A1* | 10/2014 | Kawata | H04N 1/00557 |
| | | | 312/326 |
| 2016/0128495 A1* | 5/2016 | Looze | B64F 1/366 |
| | | | 312/198 |
| 2017/0126916 A1 | 5/2017 | Miura | |
| 2018/0293204 A1* | 10/2018 | Packer Ali | G06F 1/3293 |

\* cited by examiner

REMOVABLE SCALE AND SCANNER SYSTEM CONTROL FROM A SYSTEM WITH A MAINTAINED STANDALONE CALIBRATION MEMORY

BACKGROUND

Points of sale at a retail location may use a combination scanner and scale to both weigh items (e.g., produce) and scan bar codes on merchandise for sale. Using a laser or imaging device in both horizontal and vertical windows of the scanner, the user (e.g., clerk, consumer) can move the merchandise past one or more of the windows to read the bar code printed on the exterior of the merchandise and reflect back to a light sensor. If one is purchasing something by weight instead of a bar code, the user places the merchandise on the scale that provides a measured weight to a controller. The user can then input a price per pound into the controller using a keyboard or keypad for the controller to generate a total price for the item.

Most jurisdictions require the retail scales to be calibrated in order to ensure that their measured weights are accurate and consistent. The calibration may require special equipment and/or authorized (e.g., licensed) technicians to perform the calibration. Whenever the scanner requires servicing, the scanner and scale unit is removed from the point of sale system in order to repair or replace faulty printed circuit boards or perform any other repairs. Whenever the scale is removed from the system, it should be recalibrated prior to being used again. This results in an expense and down time for the retailer to not only repair the system and pay for recalibration but the point of sale system is out of commission while waiting for an authorized technician to perform the recalibration.

SUMMARY

Devices and methods for operation of a scale and scanner system include a controller to control operation of the scale and scanner system. A scale calibration parameter memory stores scale calibration parameters and is coupleable to the controller. A scanning module and a scale module are coupleable to the controller. When the controller is not coupled to the scanning module or scale module, the scale calibration parameter memory remains in the system.

BRIEF DESCRIPTION OF THE FIGURES

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

When a scale and scanner system is serviced and the scale is removed from the retail checkstand, the scale typically needs to be recalibrated after the scale servicing has been completed and before the checkstand can be put back into service. Thus, the checkstand is unusable by the retailer until it can be recalibrated.

The recalibration may entail an authorized (e.g., licensed) technician with specialized equipment having to perform the recalibration process. The retailer not only loses use of the scale and scanner system while it is being serviced and waiting for recalibration but also has the expense of the recalibration process.

The disclosed scale and scanner system provides a two-part rotatable scale and scanner system that enables the scale module to be pivoted for servicing without removing the scale from the checkstand. Since the scale is not removed from the system, it does not need to be recalibrated.

In another embodiment, the scale calibration data may be stored in scale calibration parameter non-volatile memory (e.g., electrically erasable programmable read only memory (EEPROM), flash memory) that is electrically coupleable to but physically separate from the scanner's controller board. For example, the non-volatile memory may be located in a cable that connects the scale to the scale and scanner system. In another embodiment, the non-volatile memory may be located on the scale module. This enables the calibration data to stay with the scale when the controller board is removed for servicing or replacement or the scale module is removed from the checkstand.

Figure 1:
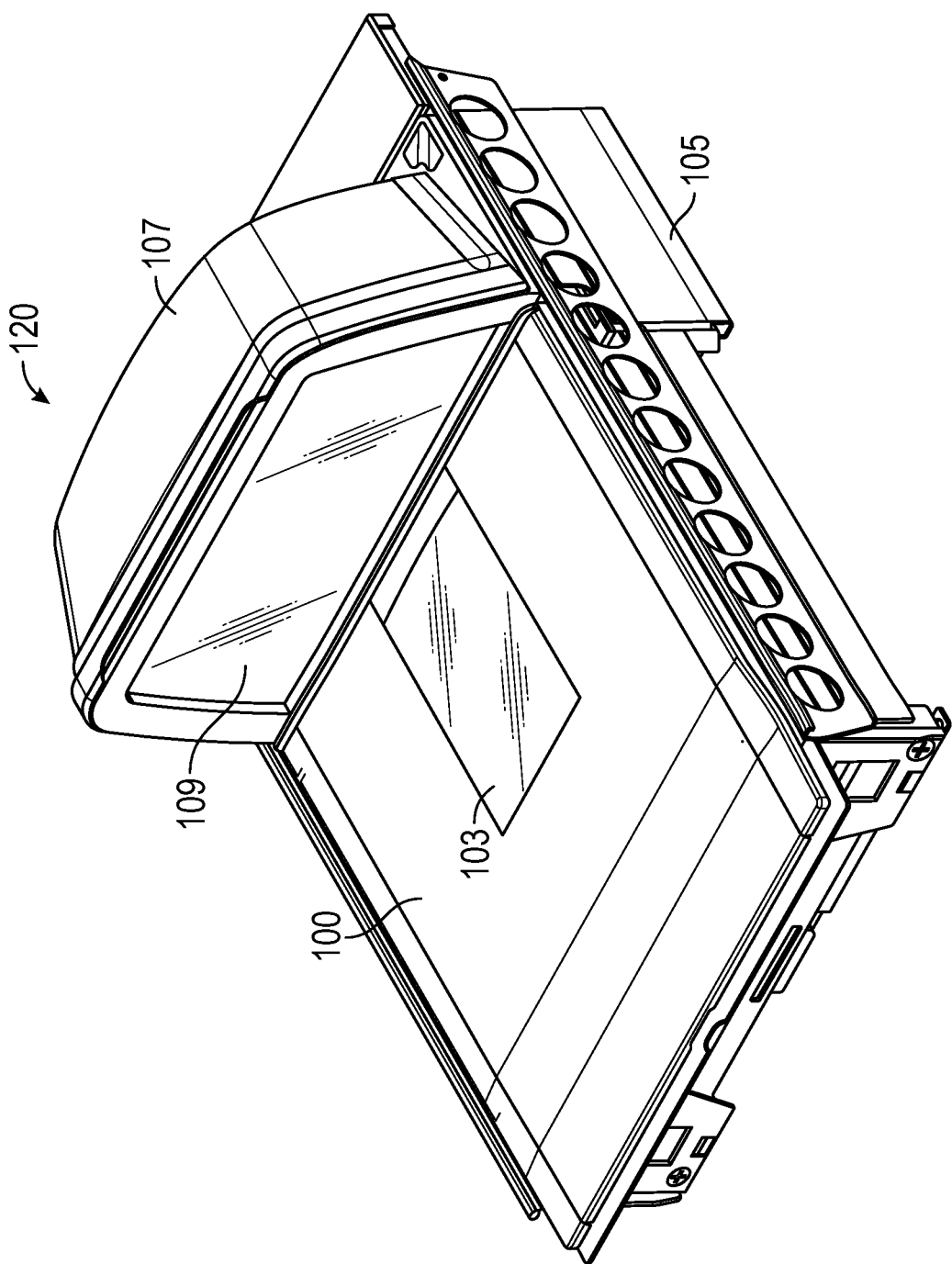
FIG. 1 shows a top right elevational view of an embodiment of the scale and scanner system.

FIG. 1 shows a top right elevational view of an embodiment of the scale and scanner system. Such a scale and scanner system may be inserted into a checkstand at a retail location. A customer or clerk can use the scanner to scan bar codes printed or affixed to merchandise. The scale can be used to weigh merchandise (e.g., produce) that is sold by a unit weight. The clerk can then key in the price per unit weight to generate the total price for the item.

The scale and scanner system includes a chassis 105 that holds the various components of the system. The chassis may be constructed of metal (e.g., steel) to provide rigid support for the scale module which may result in improved accuracy, as compared to plastic, due to reduced temperature induced side loads from materials expanding and contracting at different rates. The chassis fits into an opening in the checkstand (not shown) that may further include a cash register and payment system (e.g., card reader, near field communication (NFC) device) coupled to the scale and scanner system.

A scanning module 120 includes a tower 107 that has a vertical optical scanner 109. A top plate 100 is shown with an opening for a horizontal optical scanner 103 that is part of the scanning module 120. As shown subsequently, the top plate 100 rests on a scale module and is used to hold the merchandise to be weighed.

The scanning module 120 includes the horizontal and vertical optical scanners 103, 109 for scanning bar codes. A barcode (e.g., linear, 2D) is a visual pattern in which is encoded information readable by a machine. Barcodes can be used for a variety of reasons including tracking products, prices, and stock levels for centralized recording in a computer software system.

The most common bar code, the UPC (Universal Product Code), is a linear barcode made up of two parts: the barcode and a 12-digit UPC number. The first six numbers of the barcode is the manufacturer's identification number. The next five digits represent the item's number. The last number is called a check digit which enables the scanner to determine if the barcode was scanned correctly or not. In contrast, a 2D barcode is more complex and can include more information in the code such as price, quantity, web address, or image.

The optical scanners 103, 109 may use either laser-based scanners or image-based scanners. For example, a laser-based scanner comprises an illumination source, a sensor, and a decoder. The illumination source can include a light source (e.g., laser) and a reciprocating mirror or a rotating prism to scan a laser beam from the laser back and forth across the bar code. The optical scanners 103, 109 "scan" the black and white elements of a barcode by illuminating the code with the laser beam, the reflected light from the bar code is detected by the light sensor that generates an analog signal representative of the received reflected light. The analog signal is sent to a decoder for conversion into a data signal that represents the encoded data of the bar code. The data signal is delivered by the scanning module to a computer software system holding a database of the maker, cost, and/or quantity of all merchandise sold.

An image-based scanner uses a camera to take an image of the bar code. A light source (e.g., light emitting diodes (LEDs)) are coupled with a series of stationary mirrors that reflect the light generated by the LEDs. The imaging scanner scans the black and white elements of a barcode by illuminating the code with the LEDs. The reflected light from the barcode is detected by the camera sensors (e.g., CMOS image sensor) that delivers a mono or color digital image to the scanner processing system. The processing system identifies the barcode data that was captured in the images and converts the image data to bar code data.

Figure 2:
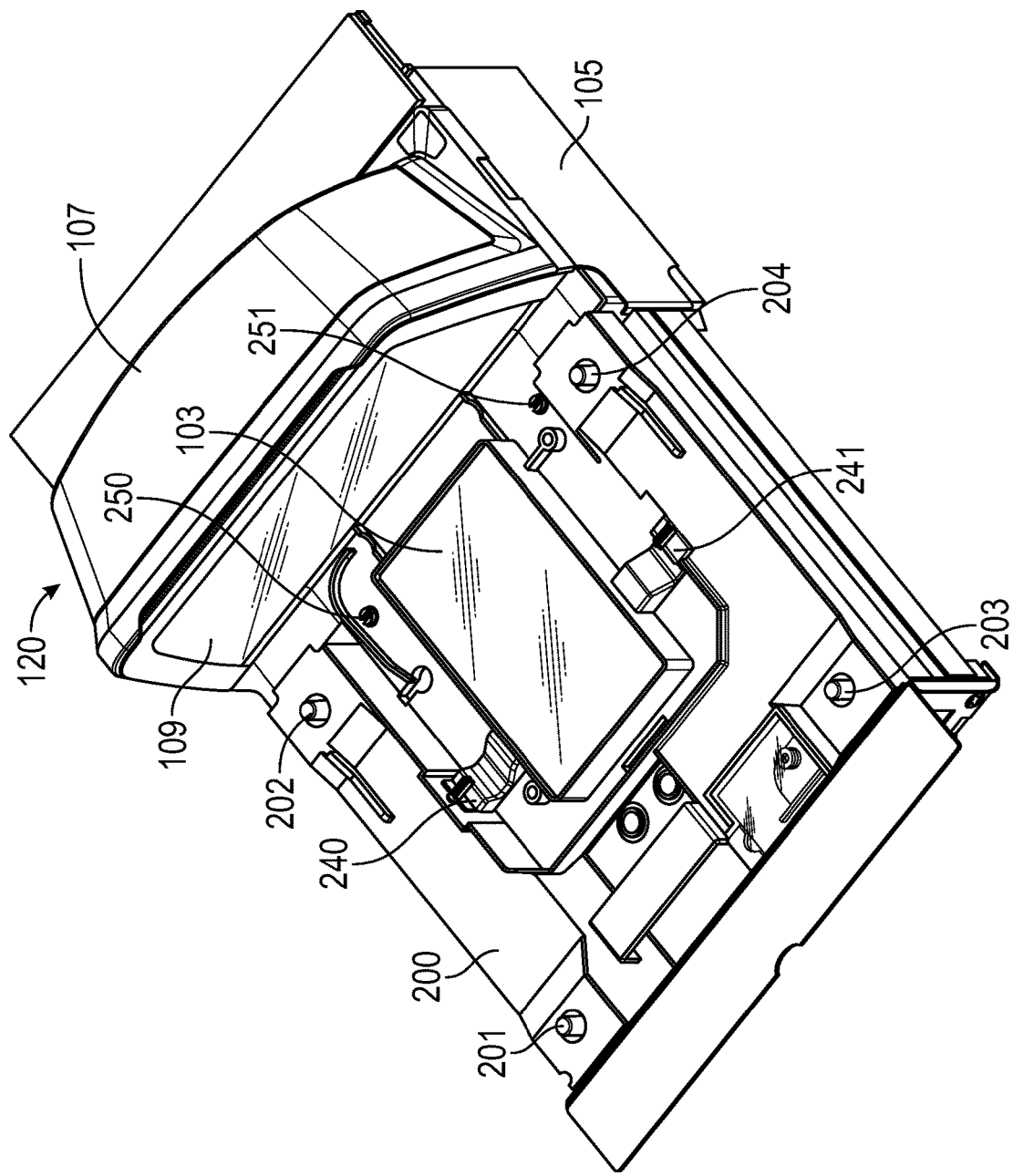
FIG. 2 shows a top right elevational view of the embodiment of FIG. 1 with a top plate removed to expose parts of the scale module.

FIG. 2 shows a top right elevational view of the embodiment of FIG. 1 with the top plate 100 removed to expose parts of the scale module. This view shows a plurality of scale module supports 201, 202, 203, 204. The top plate 100 of FIG. 1 rests on these supports 201-204 so that the weight of the merchandise on the top plate is transferred to the scale module supports 201-204. Thus, the scale module senses this downward pressure on the scale sensors and translates that pressure into the weight of the merchandise. Four supports 201-204 are shown in FIG. 2 for purposes of illustration. Other embodiments may use different quantities of supports 201-204.

The scale module itself is covered by a debris guard 200 to prevent damage to the scale module. The debris guard includes an opening (e.g., circular hole) to enable each respective scale module support 201-204 to extend through and be exposed. The scale module 700 is shown and discussed subsequently in FIG. 7.

FIG. 2 further shows a pivot mechanisms 240, 241 that enables the scanning module 120 to be rotated for servicing without removing the scale module from the checkstand. The scanning module 120 is configured to pivot about the pivot mechanisms 240, 241. As shown and described subsequently, the pivot mechanisms 240, 241 each comprise a respective pivot extension and a respective pivot support in which each respective pivot extension rests.

To hold the scanning module 120 in place during operation of the scale and scanning system, one or more retention fasteners 250, 251 (e.g., screws, bolts) may be used. The retention fasteners 250, 251 are inserted through holes of the scanning module 120 and into the chassis 105. The holes in the scanning module 120 enable the retention fasteners 250, 251 to thread into the chassis 105 in order to secure the scanning module 120 to the chassis 105 and prevent the scanning module 120 from rotating. When servicing is desired, the retention fasteners 250, 251 are loosened or removed, thus allowing rotation of the scanning module 120.

Figure 3:
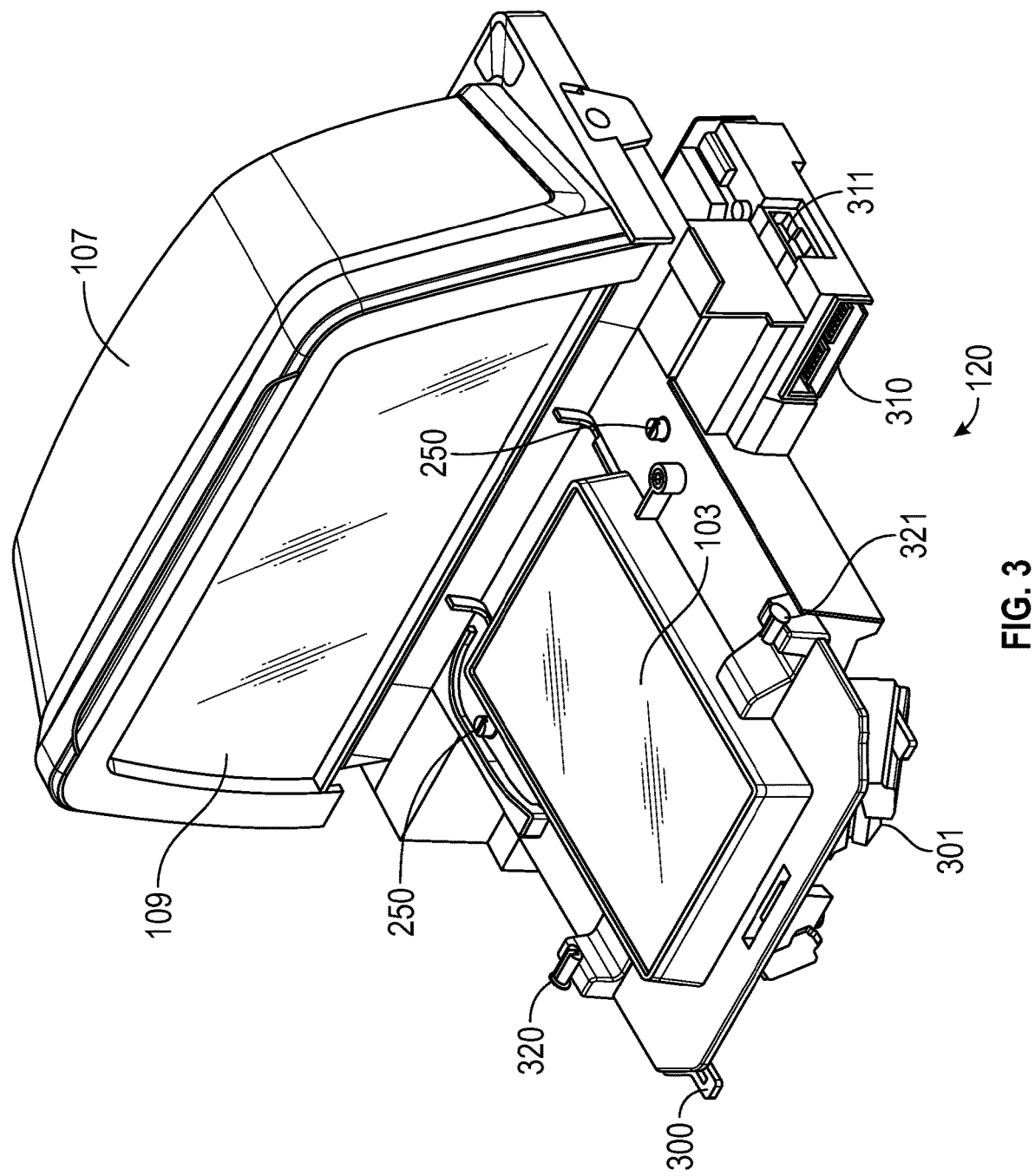
FIG. 3 shows a top right elevational view of the scanner module.

FIG. 3 shows a top right elevational view of the scanning module 120. The scanning module 120 comprises the tower 107 that includes the vertical optical scanner 109 for scanning vertically held bar codes. A glass window covers the vertical optical scanner 109.

The horizontal optical scanner 103 is positioned in the bed of the scanning module 120 for scanning horizontally held bar codes. The horizontal optical scanner 103 is also covered by a glass window to prevent damage to the optics of the system. The vertical and horizontal optical scanners 103, 109 may both comprise a substantially similar optical scanner as described previously.

The scanning module 120 further includes pivot extensions 320, 321 that are part of the pivoting mechanism 240, 241. These pivot extensions 320, 321 may be relatively small cylindrical extensions that extend horizontally along an axis from the bed of the scanning module 120 and in the plane of the bed. Rotation preventing tabs 300, 301 extend horizontally in the plane of the bed of the scanning module 120 and in a direction that is perpendicular to the axis of the pivot extensions 320, 321. The rotation prevention tabs 300, 301 engage the bottom surface of the debris guard 200 of FIG. 2 so that the scanning module 120 is prevented from over-rotating in an opposite direction from the rotation direction used to service the scanning module 120.

A scale connection port 310 provides a connector that mates directly with or through a cable to the scale module. An expansion port 311 provides another connector for connecting various modules in order to expand the capabilities of the scale and scanner system.

Figure 4:
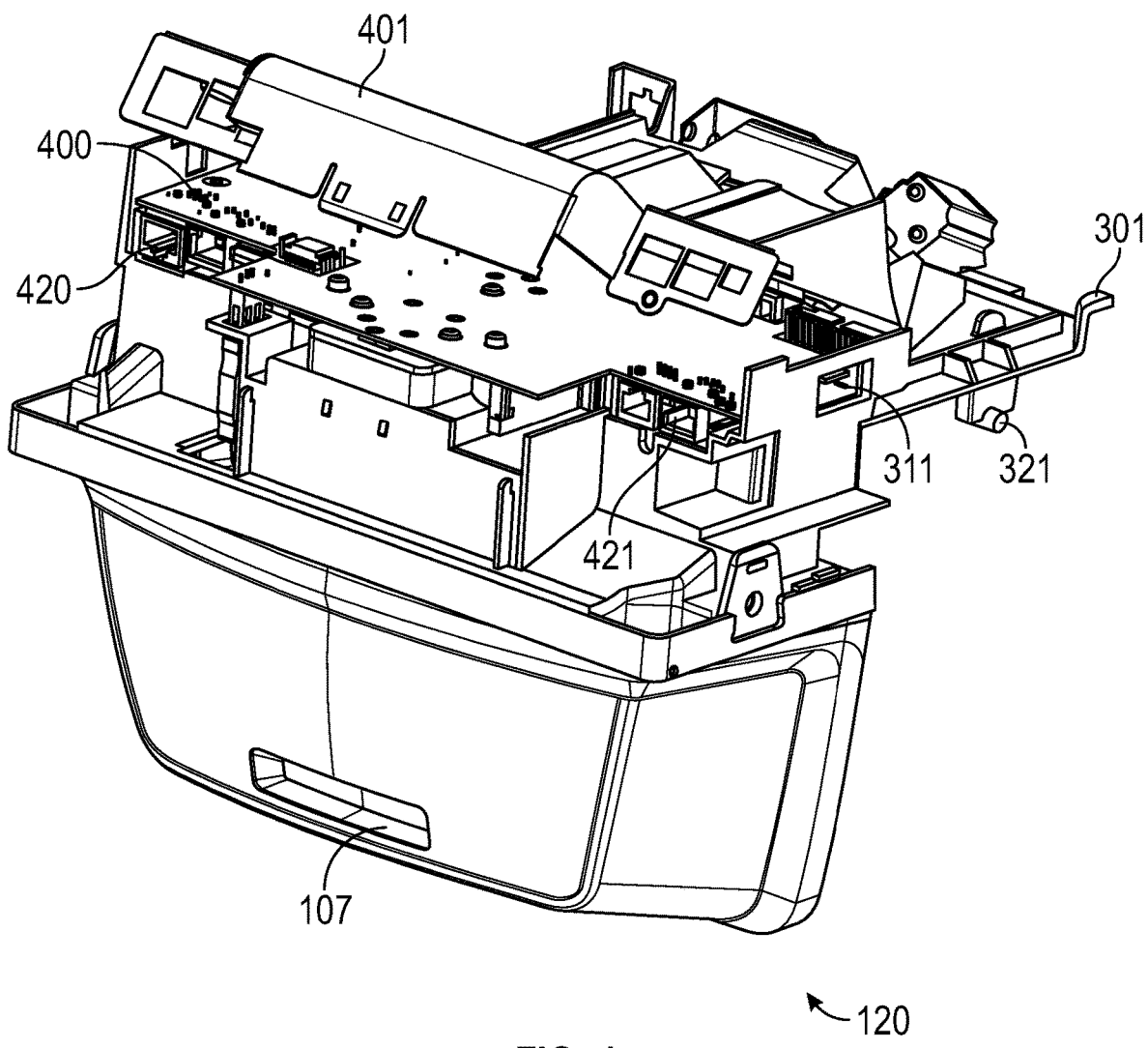
FIG. 4 shows a back and bottom elevational view of the scanner module of FIG. 3.
Figure 8:
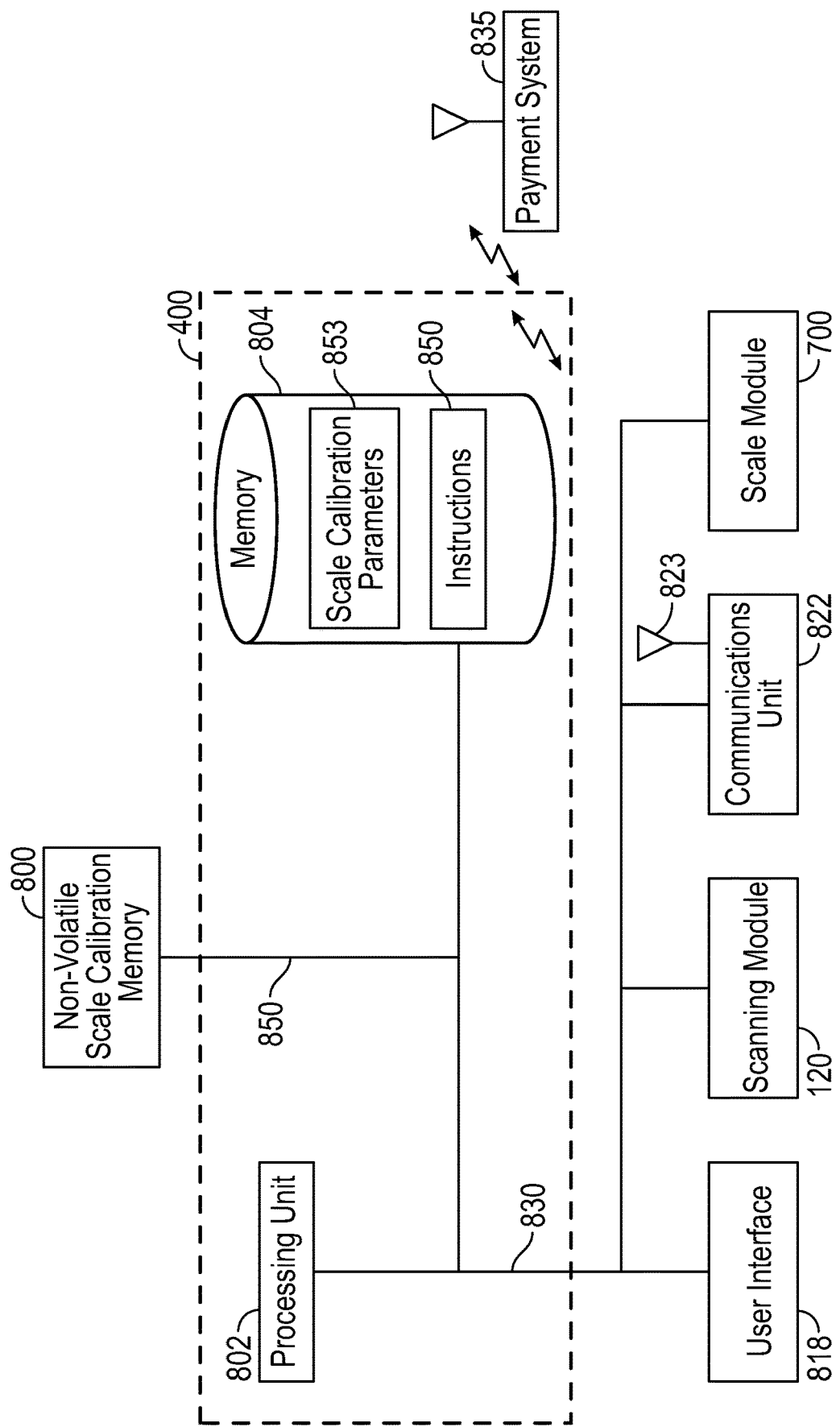
FIG. 8 shows a block diagram of an embodiment of a controller of a scale and scanner system.

FIG. 4 shows a back and bottom elevational view of the scanning module 120 of FIG. 3. This view shows the tower 107 that holds the vertical optical scanner 109. A controller 400 (e.g., digital control board) is located on the bottom of the scanning module 120. A functional block diagram of the controller 400 is shown in FIG. 8 and discussed subsequently. A board cover 401 is shown in an open position to expose the controller 400 underneath.

The rotation preventing tab 301 is shown extending from the scanning module 120 in the plane of the bed. This view also shows the pivot extension 321 that extends along the axis through both pivot extensions 320, 321 of FIG. 1.

One or more input/output (I/O) ports 420, 421 are located on the back of the scanning module 120. These ports may be electrically coupled to the controller 400 and provide expansion of the capabilities of the scanning module 120 and/or scale module 700.

Figure 5:
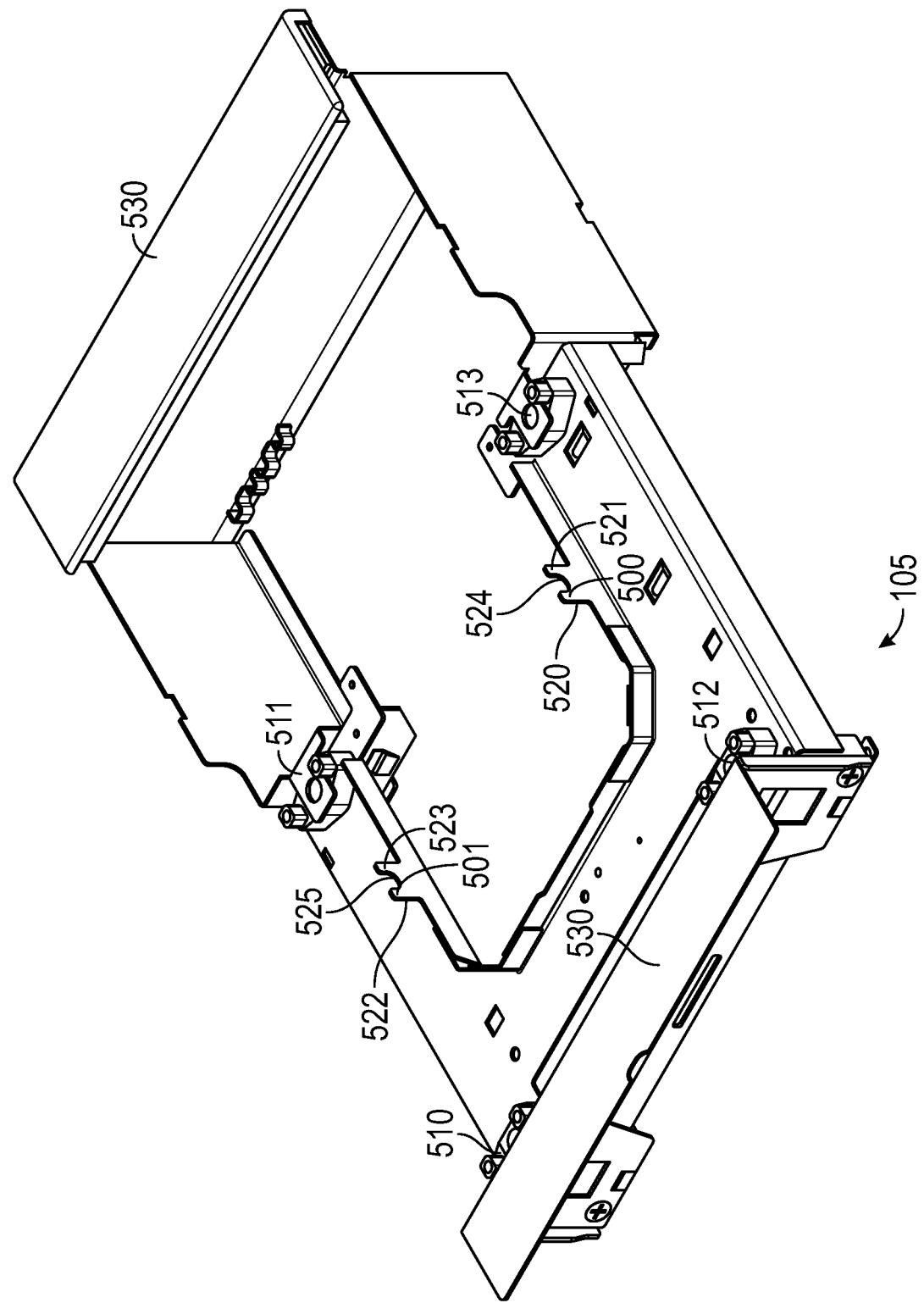
FIG. 5 shows a top right elevational view of a scale and scanner system chassis with pivot extension supports.

FIG. 5 shows a top right elevational view of a scale and scanner system chassis 105 with pivot extension supports 500, 501. The pivot extension supports 500, 501 extend perpendicular to the chassis 105 and are part of the pivoting mechanism 240, 241 as shown in FIG. 2.

The pivot extension supports 500, 501 each comprise a respective pair of support extensions 520, 521 and 522, 523. Each pair of support extensions 520, 521 and 522, 523 forms a respective semi-circular opening 524, 525 between their respective support extensions 520, 521 and 522, 523. The semi-circular openings 524, 525 each receives a respective cylindrical pivot extension 320, 321 that rests on the pivot extension support 500, 501 in the respective opening 524, 525. Thus, the semi-circular openings 524, 525 enables the cylindrical pivot extension 320, 321 to rotate within its respective pivot extension support 500, 501.

The chassis 105 further includes a plurality of scale module mounts 510, 513. The scale module mounts 510-513 not only support the scale module but also provide holes into which a fastener may be inserted in order to secure the scale module to the chassis 105.

The chassis 105 may further include a front flange 530 and a rear flange 531. The front and rear flanges 530, 531 may provide mounting surfaces for mounting the scale and scanner system in the checkstand. The tower 107 of the scanning module 120 may also rest on the front flange 530 when it is rotated for servicing, as seen in FIGS. 6A and 6B.

Figure 6A:
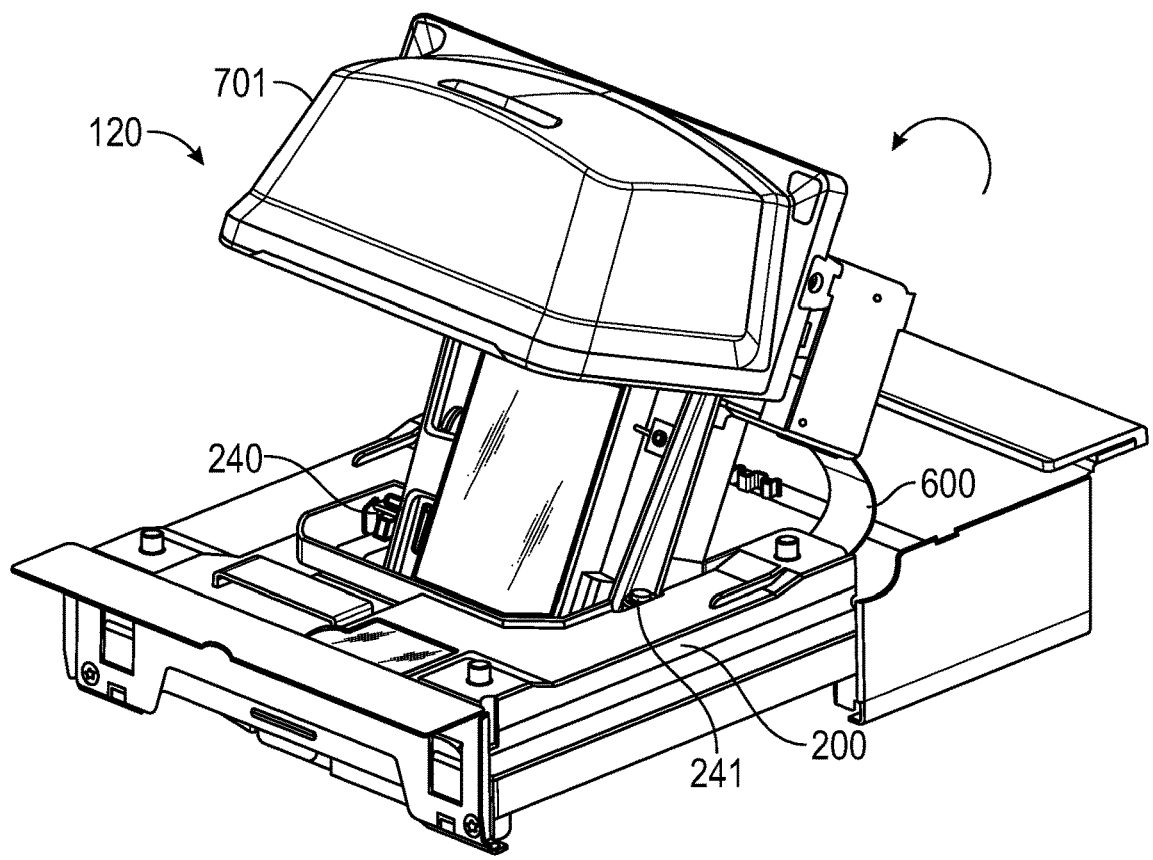
FIGS. 6A and 6B show top right elevational views of the scale and scanner system rotating with the pivot mechanisms for service.
Figure 6B:
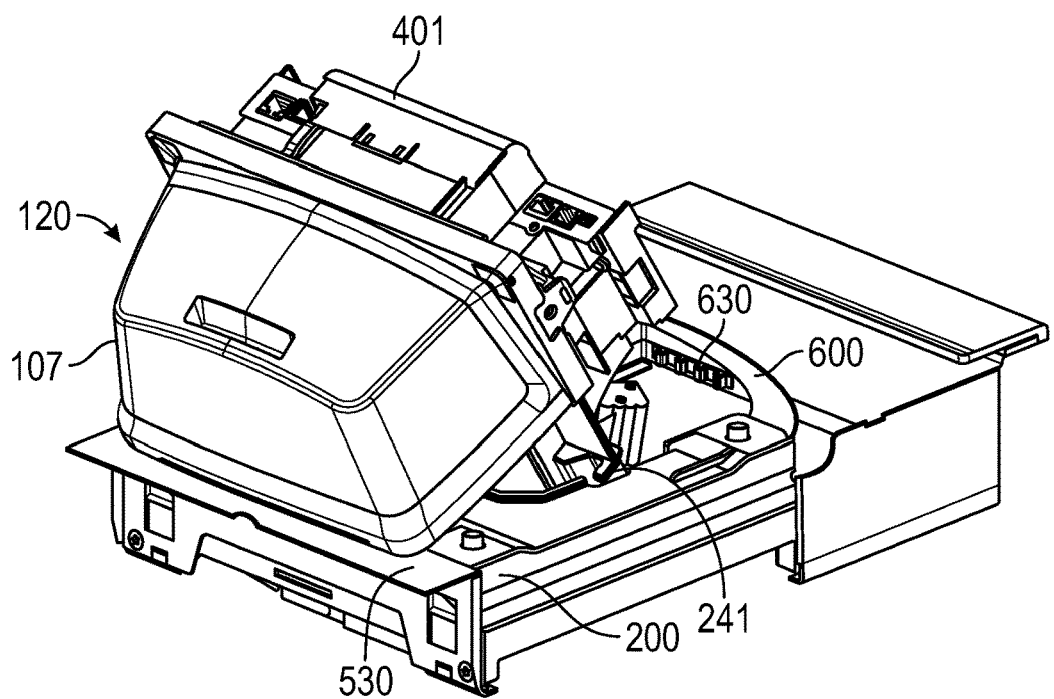

FIGS. 6A and 6B show top right elevational views of the scale and scanner system rotating with the pivot mechanisms 240, 241 for service. The retention fasteners 250, 251 have been loosened or removed so that the scanning module 120 is now free to rotate about the pivot mechanisms 240, 241. The tower 107 of the scanning module 120 initially rotates in a counter-clockwise rotation as viewed from the perspective of FIGS. 6A and 6B. As the scanning module 120 pivots, a scale cable 600 is exposed and is allowed to unfold. If the cable 600 is not long enough to allow complete rotation of the scanning module 120, the cable 600 can be detached to allow complete movement of the scanning module 120.

As seen in FIG. 6B, the scanning module 120 has been completely rotated such that the tower 107 rests on the front flange 530. This exposes the bottom of the scanning module 120 so that the board cover 401 may be opened to expose the controller 400 for servicing. The rotation of the scanning module 120 also exposes any I/O cables in I/O cable guides 630 that may be under the scanning module 120. Thus, the scanning module can now be serviced or removed and replaced without removal of the scale module as covered by the debris guard 200.

Figure 7:
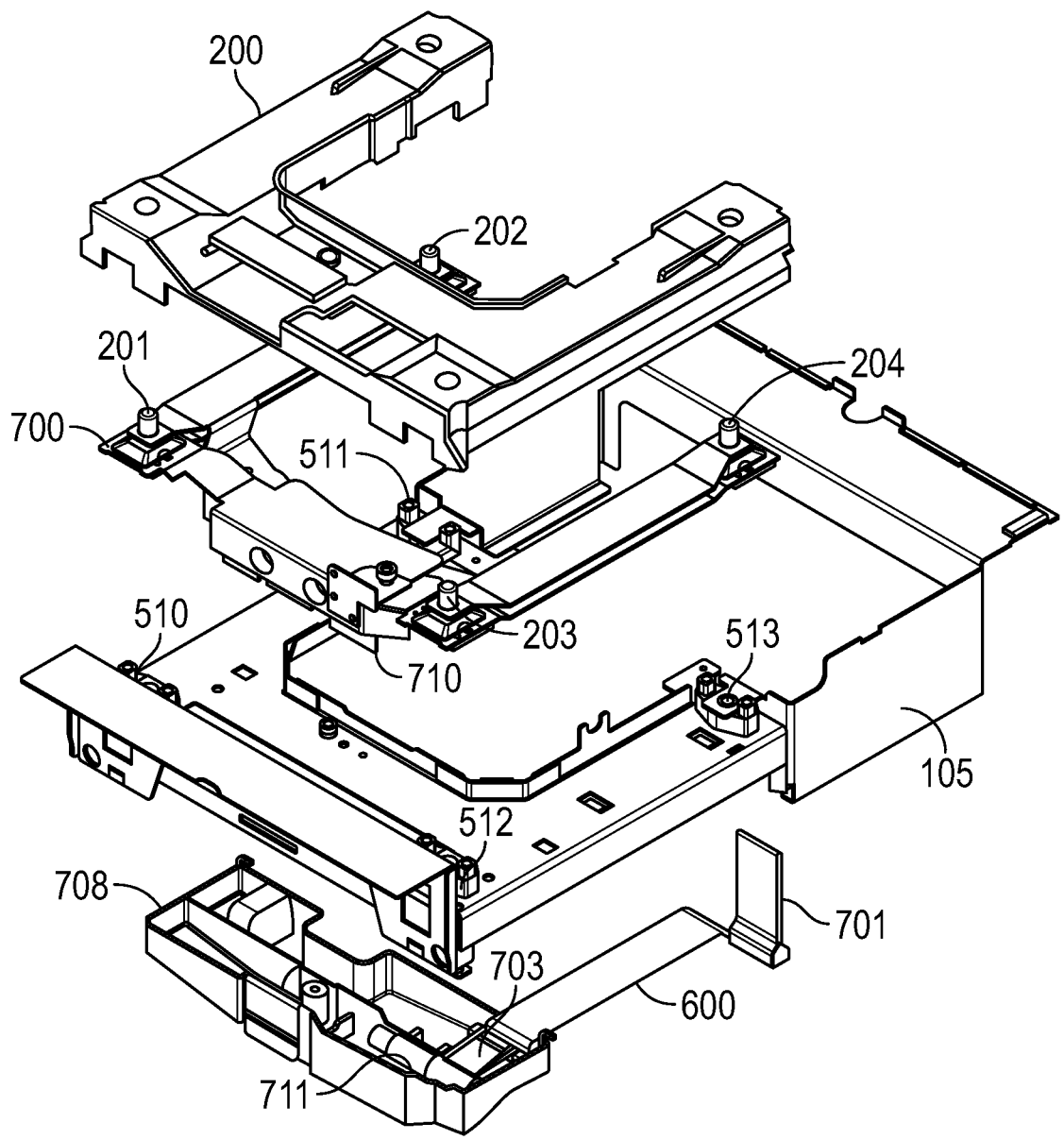
FIG. 7 shows an exploded diagram of an embodiment of the scale module.

FIG. 7 shows an exploded diagram of an embodiment of the scale module. The scale module 700 is shown with the scale module supports 201-204. The scale module 700 may also include any circuitry and connections necessary to detect the pressure on the supports 201-204 and convert that pressure to a representative weight. The scale module 700 rests on the scale module mounts 510-513 of the chassis 105.

A connector 710 on the scale module 700 mates with a connector 711 on a scale module bottom cover 708. These connectors 710, 711 provides the scale module with an electrical connection to the scale module cable 600 with its connector 701 that connects to the controller 400 of the scanning module 120.

Non-volatile scale calibration parameter memory 703 may be part of this cable 600. When the scale module is calibrated, the calibration parameters are stored in the non-volatile scale calibration parameter memory 703. If the scanning module 120 is removed for servicing (with the controller 400), the non-volatile scale calibration parameter memory 703 remains with the system. When the scanning module 120 and its controller 400 is returned from servicing, the calibration data can then be read from the non-volatile scale calibration parameter memory 703 and loaded back into the controller memory. In another embodiment, the non-volatile scale calibration parameter memory 703 is mounted elsewhere in the system but still separate from the controller 400.

FIG. 8 shows a block diagram of an embodiment of a controller of a scale and scanner system. The system is shown communicating with a payment system 835 for purposes of illustration only. The payment system 835 may be separate from the scale and scanner system or part of the scale and scanner system.

A processing unit 802 may include one or more processors or other control circuitry. For example, the processing unit 802 may include one or more central processing units (CPUs), microprocessors, and/or dedicated controllers (e.g., application specific integrated circuits (ASIC), field programmable gate arrays (FPGA)). For purposes of illustration, the processing unit 802 is shown as part of the controller 400. However, other embodiments may have multiple processors that are not physically located on the controller board. For example, the controller 400 may control both the scanning module 120 and the scale module 700. In another embodiment, the scale module 700 may have a separate processor with associated memory.

Memory 804 may include any type of long or short term data storage. For example, the memory 804 may include semiconductor memory such as random access memory (RAM), read only memory (ROM), or flash memory (e.g., solid state drive (SSD)). The memory 804 may also include magnetic disk memory (e.g., hard disk drive (HDD)), optical memory, or magnetic tape memory.

The memory 804 may store instructions 150 that make up one or more applications executable by the processing unit 802. The memory 804 may also store scale calibration parameters 153 that are generated by the scale calibration process. The memory 804 and processing unit 802 are part of the controller 400 for the scale and scanner system. Thus, the scale calibration parameters 153 stored in the memory 804 are removed with the controller 400 when the controller 400 or the scanning module 120 is serviced.

Separate non-volatile scale calibration parameter memory 800 is coupled to the processing unit 802 and memory 804 through a bus 850. The non-volatile scale calibration parameter memory 800 separately stores the calibration parameters generated during the calibration process. These parameters are also stored in the memory 804 of the controller 400. In an embodiment, the non-volatile scale calibration parameter memory 800 may also store any system configuration parameters for the scale and scanner system.

The non-volatile scale calibration parameter memory 800 is physically located in a location of the system other than the controller board 400. For example, as illustrated in FIG. 7, the non-volatile scale calibration parameter memory 800 may be located in the scale cable 600 or the scale module bottom cover 708. Thus, the separate non-volatile scale calibration parameter memory 800 remains with the system if the scanning module 120 and/or the controller board 400 is removed.

For purposes of illustration, the processing unit 802 and memory 804 are shown as part of the controller 400. However, other embodiments may have multiple processors and other memory that are not physically located on the controller board. For example, the controller 400 may control both the scanning module 120 and the scale module 700. In another embodiment, the scale module 700 may have a separate processor with associated memory or simply a separate processor that communicates over a bus with the controller memory 804.

The system further includes the scanning module 120 and the scale module 700 that are coupled to and controlled by the controller 400. The scanning module 120 and scale module 700 may be electrically coupled to the controller board 400 using a bus structure or a plurality of separate electrical connections.

A user interface 818 may include any number of devices that allow a user to interface with the system. Examples of user interfaces 818 may include a keypad, a keyboard, a microphone, or a touchscreen display. The user (e.g., customer, retail clerk) may use any one or more of the user interfaces 818 to provide user inputs to an application executing on the controller 400.

A communications unit 822 with antenna 823 enables the system to communicate over a wired or wireless channel with another computing device, computer server, or network (e.g., local area network, wide area network, personal area network). For example, the communications unit 822 may include radios for communicating over a wireless channel using any radio access technology (e.g., Bluetooth®, WiFi, cellular, near field communications (NFC)), Ethernet cards for using Ethernet protocols over a wired channel, or near-field communications modules. Radios in the communications unit 822 may transmit and receive over the antenna 823 coupled to the communications unit 822. The communications unit 822 may be used for transmitting retail data, such as customer payment information, to the payment system 835.

The calibration process includes adjusting the scale measurements using a set of specially calibrated weights that have been determined to be accurate. The calibration may be performed using kilograms, pounds, or both.

To start the calibration process, the controller is placed in a calibration mode. The scale controller then requests (e.g., aurally or on display) that a certain weight be placed on the scale top plate. The scale measures this weight and determines the difference between what was measured and what weight was expected. This difference is the scale calibration parameter for that particular weight and is stored in memory. Once that particular weight is calibrated, the scale informs the user to place a particular different weight, from the set of weights, on the top plate. The difference is again determined between the measured weight and the expected weight. This difference is also stored as a scale calibration parameter. This process is repeated for multiple weights to generate a plurality of scale calibration parameters. Once the calibration process is complete, the scale is placed back into the operational mode.

Figure 9:
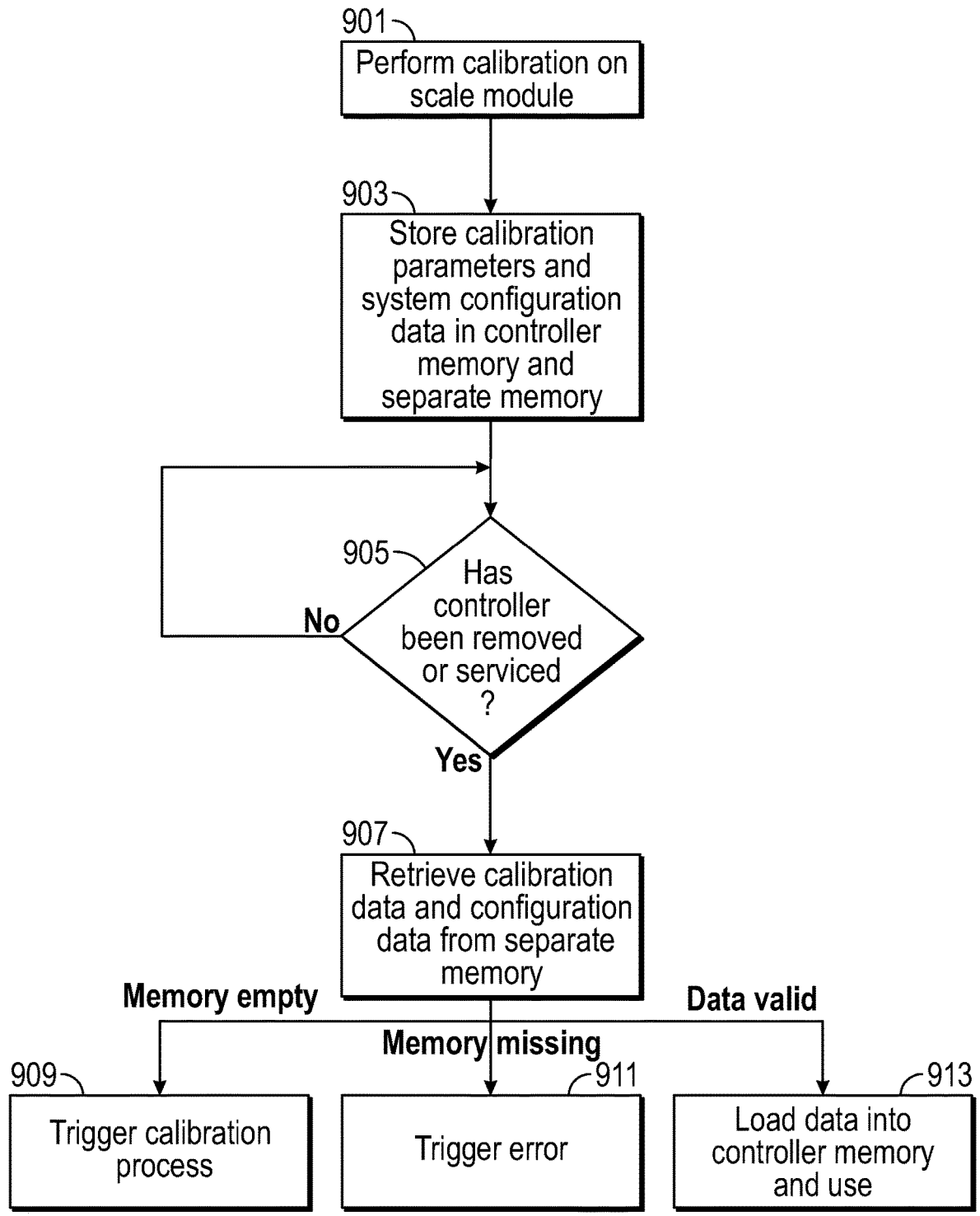
FIG. 9 shows a flowchart of an embodiment of a method for scale servicing.

FIG. 9 shows a flowchart of an embodiment of a method for scale servicing. In block 901, a calibration is performed on the scale module to generate the scale calibration parameters. In block 903, the scale calibration parameters are stored in controller memory and scale calibration parameter memory. The scale calibration parameter memory is physically separate from the controller and the controller memory. Block 905 determines if the controller with the controller memory has been removed or serviced. If the controller and controller memory has not be removed or service, the process continues to wait until it is. If the controller and controller memory has been removed or serviced, the scale calibration parameters are retrieved from the separate scale calibration parameter memory after the controller memory has been returned to the system in block 907.

In block 909, if the scale calibration parameter memory is empty, a calibration process is triggered. In block 911, if the scale calibration parameter memory is missing or the data corrupt, an error message is triggered. This message may be displayed on a system display or test equipment coupled to the system. If the scale calibration parameter memory comprises valid data, in block 913 the scale calibration parameters are loaded from the scale calibration parameter memory to the controller memory and used to calibrate the scale module.

In an embodiment, the system configuration may be stored in the scale calibration parameter memory. The system configuration parameters may be used to program a communication protocol of the scanner/scale to the point of sale (POS) equipment, enable or disable specific bar code types (e.g., Code 128, Code 39, QR code), enable external device support, choose weight type used (e.g., kilogram, pound), or enable a security feature.

Figure 10:
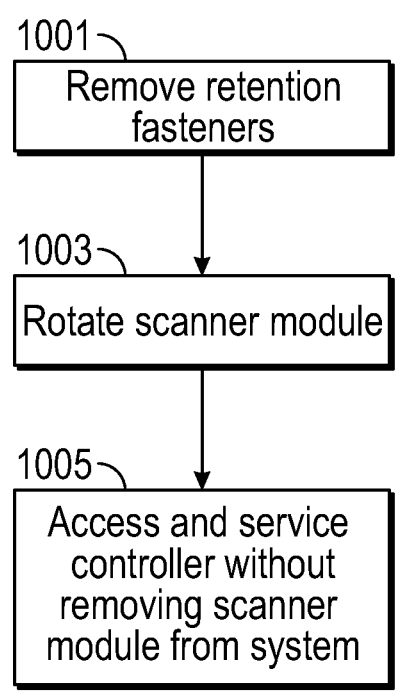
FIG. 10 shows a flowchart of an embodiment of a method for servicing the scale and scanner system.

FIG. 10 shows a flowchart of an embodiment of a method for servicing the scale and scanner system. In block 1001, the retention fasteners are removed so that the scanner module is able to rotate within the pivot mechanisms. In block 1003, the scanner module is rotated to expose the controller comprising the controller memory. The rotation of the scanner module includes rotating in a direction that disengages the rotation preventing tabs from a surface of the system (e.g., debris shield) so that the scanner module can rotate.

In block 1005, the controller is serviced without removing the scanner module from the system. In an embodiment, the scanner module and the controller may be serviced without removing either the scanner module or the controller from the system, thus the calibration parameters may remain in the controller memory.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A scale and scanner system comprising:
   a chassis;
      a scanning module rotatably coupled to the chassis; and
      a controller board comprising a processing unit and a first memory;
      the controller board coupleable to the scanning module and the processing unit configured to control operation of the scale and scanner system;
      a scale calibration parameter memory electrically coupleable to and physically separate from the controller board, the scale calibration parameter memory configured to store scale calibration parameters;
      a scale module coupled to the chassis and coupleable to the controller board;
      wherein when the controller board completes a scale calibration process, the scale calibration parameters are separately stored in the scale calibration memory, and wherein when the controller board is not coupled to the scanning module or the scale module, the scale calibration parameter memory with the sale calibration parameters stored in the scale calibration parameter memory remains in the system and are retrievable from the scale calibration parameter memory when the processing unit of the controller board is coupled to the scanning module or the scale module.

2. The scale and scanner system of claim 1, wherein the processing unit of the controller board is configured to load the scale calibration parameters from the scale calibration parameter memory after the controller board is re-coupled to the scale module and the scanning module.

3. The scale and scanner system of claim 1, wherein the scanning module is configured to rotate within the chassis to expose the controller board.

4. The scale and scanner system of claim 3, wherein the scanning module comprises:
   a scanning bed comprising a horizontal optical scanner;
   a tower comprising a vertical optical scanner, the tower coupled to the scanning bed;
   rotation preventing tabs that extend horizontally outward from the scanning bed and in a plane of the bed; and
   retention fasteners that extend through the scanning bed into the chassis to prevent rotation of the scanning module within the chassis.

5. The scale and scanner system of claim 4, wherein the scanning module further comprises cylindrical extensions that extend horizontally along an axis from the bed of the scanning module in the plane of the bed and perpendicular to the axis.

6. The scale and scanner system of claim 5, wherein the rotation preventing tabs engage a surface of a debris shield to prevent the scanning module from rotating.

* * * * *